United States Patent [19]

Thune

[11] 4,100,828
[45] Jul. 18, 1978

[54] APPARATUS FOR RIB TRIMMING OF UNIVERSALLY MOLDED BATTERY CONTAINER

[75] Inventor: Robert H. Thune, Anderson, Ind.

[73] Assignee: General Motors Corporation, Detroit, Mich.

[21] Appl. No.: 798,592

[22] Filed: May 19, 1977

Related U.S. Application Data

[62] Division of Ser. No. 715,070, Aug. 17, 1976, Pat. No. 4,041,603.

[51] Int. Cl.² .......................... B26D 3/00; B26D 3/28
[52] U.S. Cl. .......................................... 83/1; 83/185; 83/554; 83/555; 83/914
[58] Field of Search ................. 83/1, 4, 185, 186, 554, 83/555, 914, 191; 90/24 B; 29/623.1, 731

[56] References Cited

U.S. PATENT DOCUMENTS 3,868,773   3/1975   Province .......................... 83/914 X Primary Examiner—J. M. Meister
Attorney, Agent, or Firm—Lawrence B. Plant

[57] ABSTRACT

A multicell battery case, adaptable for use with a variety of cell-pack sizes, is molded with universal-sized cell compartments and opposing spacer-ribs projecting a predetermined distance into the cell compartments from the compartments' walls so as to provide an inter-rib gap across the compartment substantially equal to the narrowest cell pack useful with that case. The case is thereafter adapted for use with thicker cell packs by trimming back the opposing ribs to increase the gap therebetween to approximately the thickness of the cell pack actually destined for use with that case. Preferably, rib-shaving blades are inserted into the case and guided in spaced relation from the rib-bearing walls to remove distal portions of the ribs. Means are provided to detach the shavings from the container at their roots.

2 Claims, 17 Drawing Figures

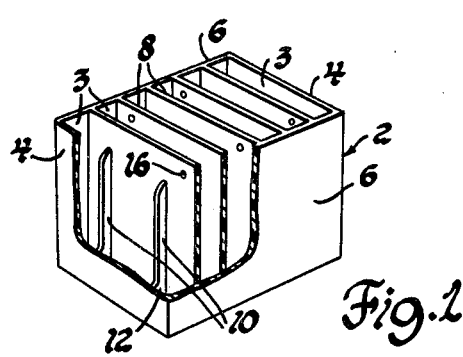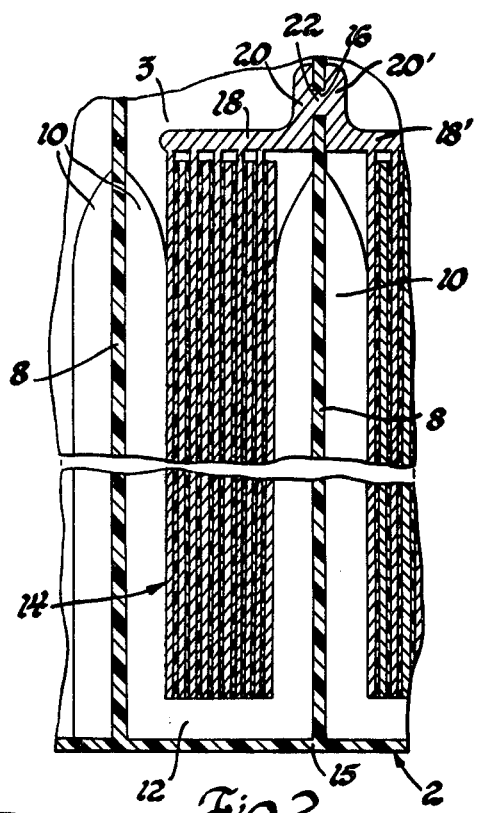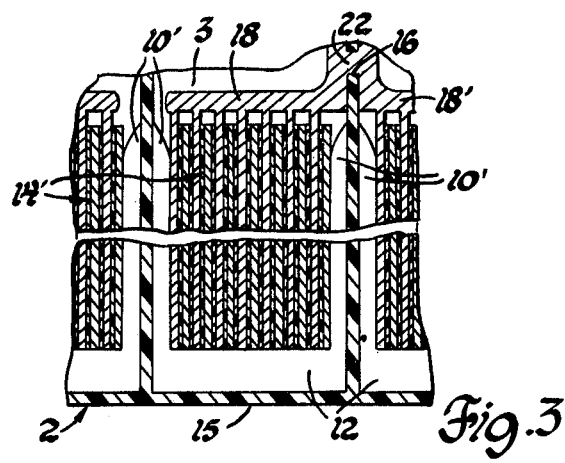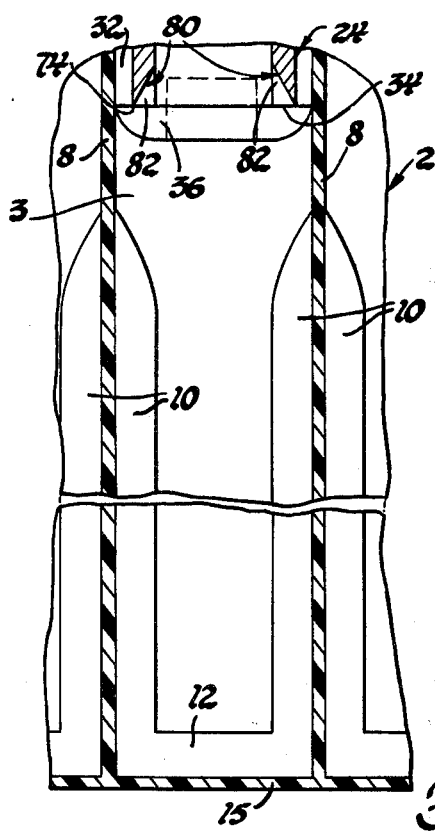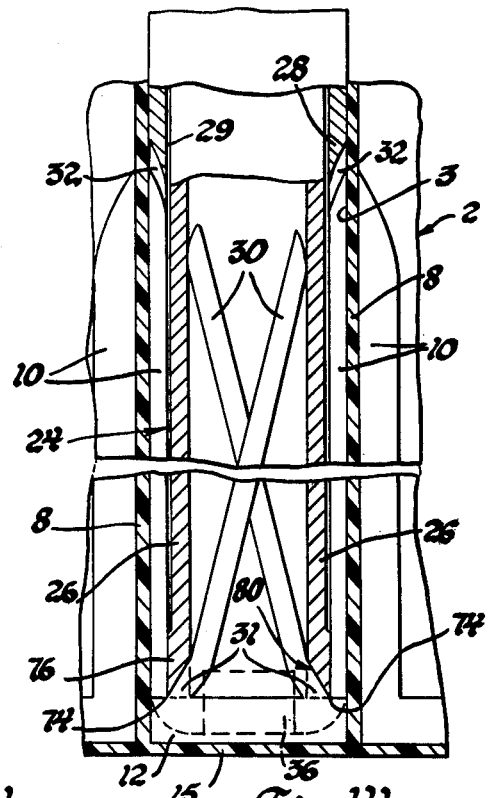

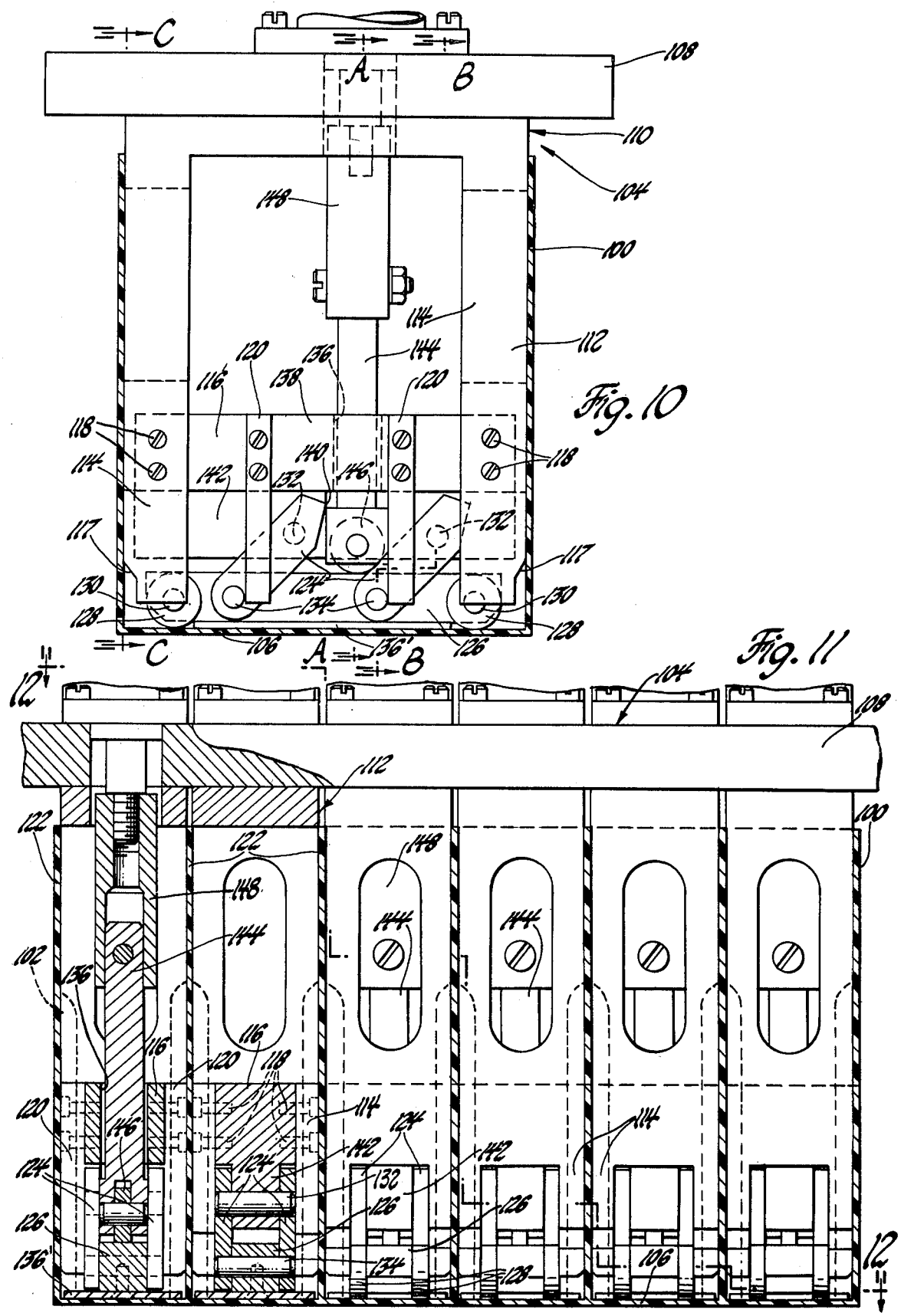

APPARATUS FOR RIB TRIMMING OF UNIVERSALLY MOLDED BATTERY CONTAINER

This is a division of application Ser. No. 715,070 filed on Aug. 17, 1976, now U.S. Pat. No. 4,041,603.

BACKGROUND OF THE INVENTION

This invention relates to the packaging of electrical storage battery cell-packs, and more particularly to a process for adapting a universal battery case to use with a variety of cell-pack sizes.

Automobile battery containers have standardized outside dimensions and battery manufacturers provide different energy capacity batteries in each case size. This is done by varying the number of positive and negative plates in each cell which in turn varies the thickness of the cell pack comprising those plates. Traditionally the lower energy batteries contain about nine plates per cell-pack while the higher energy batteries contain about sixteen plates per cell-pack, and these packs vary in thickness from about 2.42 cms. to about 4.24 cms., respectively. Each cell-pack is spaced from the walls of the cell compartment and held substantially centrally of the compartment by ribs molded onto the compartment walls. Larger ribs (i.e., in greater relief from their associated wall) are used for the thinner packs and conversely smaller ribs for the thicker packs. To provide this variety of batteries, many battery manufacturers inventory at least one case mold for each battery model it sells and consume time and effort in changing over from one mold to the next for each production run. Other manufacturers inventory a lesser number of molds and incorporate inert spacers (e.g., extra separators, corrugated plastic sheets, etc.) in each cell pack to effect a standardized cell pack thickness regardless of the number of electrochemically active plates in each pack. This approach however, adds the cost of the spacers to the battery and frequently complicates the in-plant handling of the cell pack, particularly during its insertion into the case.

It is an object of this invention to provide a battery case rib trimming operation and tool which are consistently reliable under high speed mechanized production conditions, and as a result, achieve substantial economies from the use of a single universal case (i.e., container) for several battery models in each standardized size, which case is molded with spacer ribs sized for use with the narrowest cell pack useful with the case, which ribs are thereafter accurately trimmed off at a predetermined distance from the cell compartment walls to accommodate thicker cell packs. This and other objects and advantages of the invention will become more apparent from the detailed description which follows.

BRIEF DESCRIPTION OF THE INVENTION

This invention comprehends: molding a universal, battery case for each standardized case size, which case has a plurality of individual cell compartments defined in part by lateral walls (i.e., intercell partitions or case end walls) having spacing ribs projecting therefrom into the compartments a predetermined distance for engaging and positioning a narrow cell pack substantially centrally of the compartment; guiding a rib trimmer into the container in spaced relation to the cell's lateral walls and trimming off the distal portions of said ribs at a predetermined distance from those walls to reduce the elevation of the as-molded ribs and provide a gap between the rib remnants which is approximately equal to the thickness of a thicker cell pack destined for actual use with the particular battery container; and then removing the trimmings.

DESCRIPTION OF THE DRAWINGS

FIG. 1 is a partially sectioned perspective view of a multicell battery case;

FIG. 2 is a sectioned, side elevational view of a portion of one cell of the battery case with large ribs and a thin cell pack;

FIG. 3 is a sectioned, side elevational view of a portion of one cell of a battery with ribs trimmed smaller and a thick cell pack;

FIG. 4a is a sectioned, side elevational view of a cell compartment of a battery with large ribs prior to trimming and showing a shaving trimmer poised for insertion into the compartment;

FIG. 4b is a sectioned, side elevational view of a cell compartment of a battery after shaving and before the trimmings are snipped off;

FIG. 10 is a front elevational view of a tool for detaching rib trimmings from the bottom of a container;

FIG. 11 is a partially sectioned, side elevational view of a group of six trimming detachers (i.e., FIG. 10) mounted for use with a six cell, 12 volt battery in which the detacher in the first cell is shown sectioned along the line A—A of FIG. 10, the detacher in the second cell is shown sectioned along the line B—B of FIG. 10, and the detachers in cells 3-6 are shown as viewed along the line C—C of FIG. 10;

DETAILED DESCRIPTION OF THE INVENTION

Figure 4C:
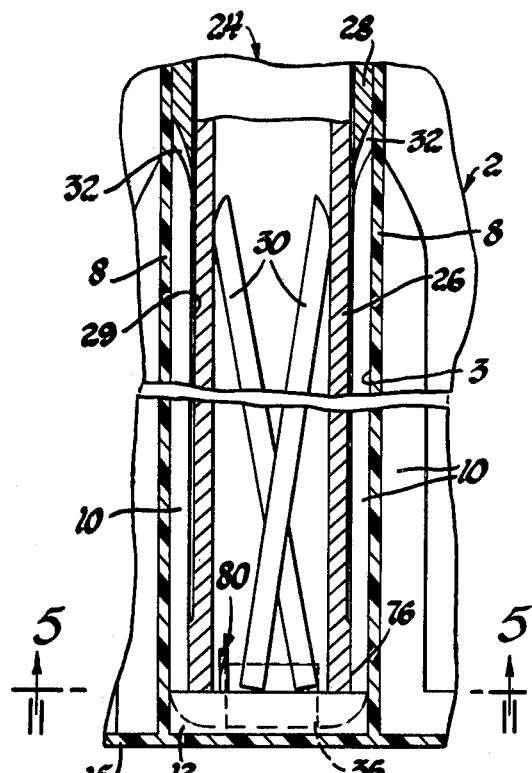
FIG. 4c is a sectioned, side elevational view of a cell compartment of a battery after shaving and snipping off of the trimmings.

In FIG. 1, there is shown a multicell battery container 2 comprising end walls 4, side walls 6 and intercell partitions 8 dividing the case 2 into a plurality of individual cell compartments 3. The compartments' lateral walls (i.e., end walls 4 and partitions 8) have ribs 10 which hold the battery's electrochemical cell elements (i.e., cell packs of positive and negative plates and microporous separators) tightly together substantially centrally of the cell compartments and spaced from their lateral walls. In this particular container, bridges 12 are provided at the bottom of each compartment to support the cell packs 14 above the bottom 15 of the container 2. In other containers, the bridges may be eliminated as will be discussed later herein. Apertures 16 formed in the partitions 8 permit electrical interconnection of adjacent cells by means of intercell connectors 22 (see FIG. 2) joining the upstanding lug portions 20—20' of the plate straps 18—18' as is known in the art.

In practicing the invention (i.e., FIGS. 1–9), a battery container 2 is molded such that opposing ribs 10 project sufficiently from their associated lateral walls 4, 8 to snugly accommodate therebetween the thinnest cell pack 14 useful with that case as illustrated by the ten plate pack shown in FIG. 2. Thereafter, an appropriate tool, guided into the case with reference to the ribs' associated walls 4, 8, trims back the ribs 10 to a lesser elevation to accommodate a thicker cell pack (e.g., the 14 plate pack 14' of FIG. 3). In one example (e.g., FIG. 2) of a 12 inch case, the space between partitions 8 is about 1.885 inches and the as-molded, opposing ribs 10 extend about 0.465 inch from each partition 8 into the compartments 3 to provide a gap between the distal portions thereof of about 0.954 inch for snugly receiving a 10 plate cell pack of about that thickness. Portions 30 (i.e., see FIG. 4c) of the ribs 10 are then removed to form a lower (i.e., about 0.108 inch) silhouette rib 10' to accommodate a 14 plate cell pack 14' (e.g., FIG. 3) which is about 1.67 inches thick.

Figure 5:
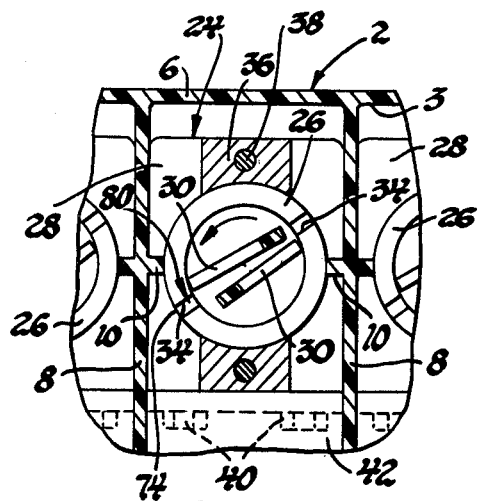
FIG. 5 is a sectioned, bottom view in the direction 5—5 of FIG. 4c.
Figure 6:
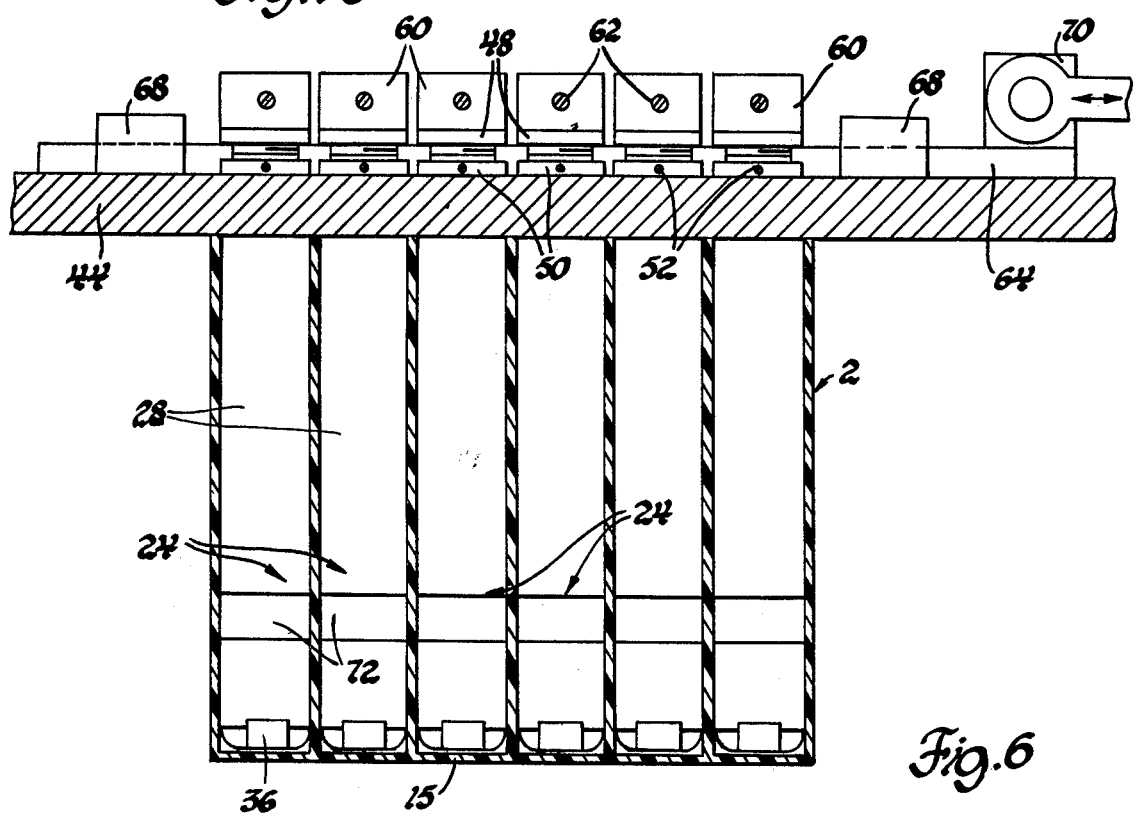
FIG. 6 is a partially sectioned, side elevational view of a tooling arrangement for trimming battery case ribs in accordance with this invention.

FIGS. 4a, 4b and 4c illustrate one embodiment of the invention in which the as-molded ribs 10 are trimmed by shaving off portions 30 to the top of the bridges 12. These portions or trimmings 30 are thereafter snipped off at the top of the bridge line. More specifically, FIGS. 4a, 4b and 4c illustrate one cell compartment 3, partitions 8, ribs 10, bridges 12 and a shaver tool 24 at various stages in the operation. FIG. 4a depicts the case 2 prior to trimming with the shaver 24 in the compartment 3, but poised above and aligned with the ribs 10 and ready for complete insertion and coincident shaving. The shaver 24 includes a guide block 28 which engages the partitions 8 and guides a tubular shaving blade 26 as it moves down into the compartment in spaced relation to the partitions 8. Die blocks 36 affixed to the bottom of the guide block 28 facilitate a subsequent snipping off of the shavings 30. Slots 32 in the guide block 28 receive the ribs 10 during insertion and trimming. The tubular shaving blade 26 is rotatable in a longitudinal bore 29 in the blade guide 28. Angular slots 80 are cut into the bottom annulus of the tubular blade 26 to form the shaving edges 74 of the blade 26. The side walls 82 of the slots 80 form cutting edges 34 with the bottom of the blade, which edges 34, upon rotation of the blade 26 act against the die blocks 36 to snip off the distal portions or trimmings 30 from the lugs 10 at the top of the bridges 12 (see FIG. 4c). FIG. 4b depicts the shaver 24 after insertion into the compartment 3 and the distal portions or trimmings 30 have been shaved off from the ribs 10, but are still attached at their bottom portions 31 to the bridge 12. FIGS. 4c and 5 depict the aforesaid snipping operation in which the blade 26, which was guided vertically into the compartment in spaced relation to the partitions 8, is next rotated such that the edges 34 in concert with die blocks 36 snip off the trimmings 30 from atop the bridges 12.

Figure 7:
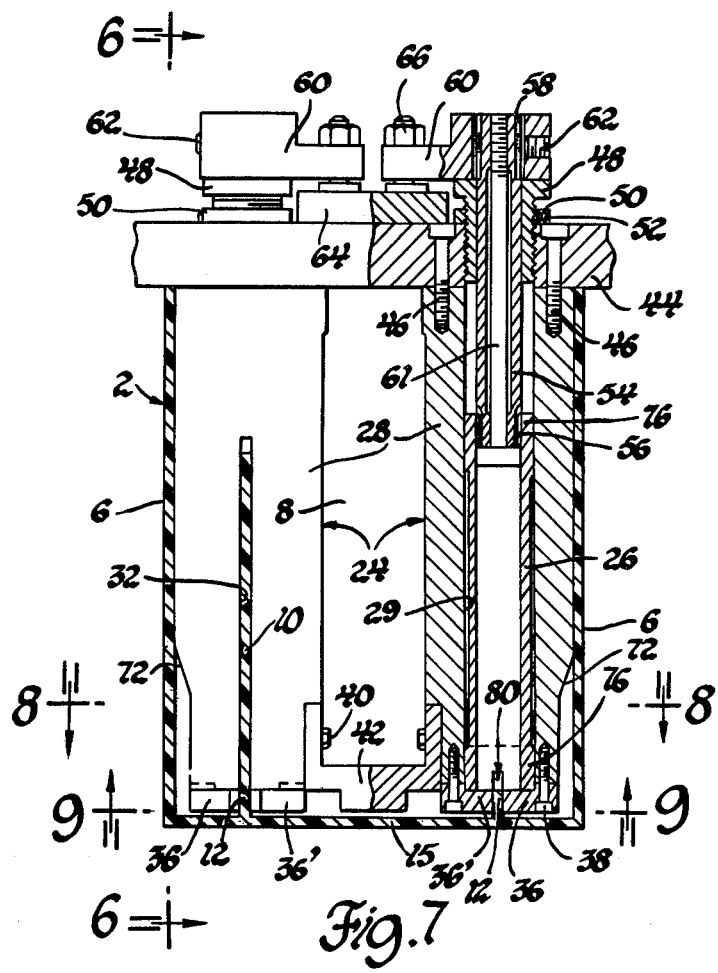
FIG. 7 is a sectioned, side elevational view in the direction 7—7 of FIG. 8 with one of the shavers shown in section and the other in unsectioned, side elevation.
Figure 8:
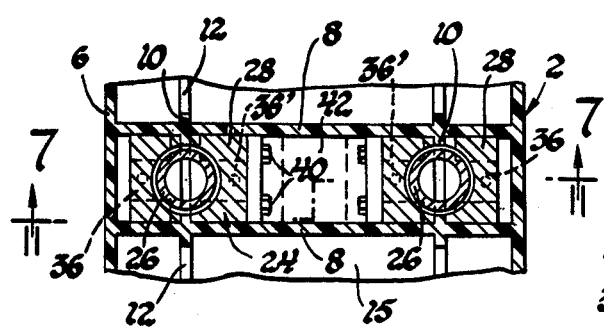
FIG. 8 is a sectioned, top view in the direction 8—8 of FIG. 7.
Figure 9:
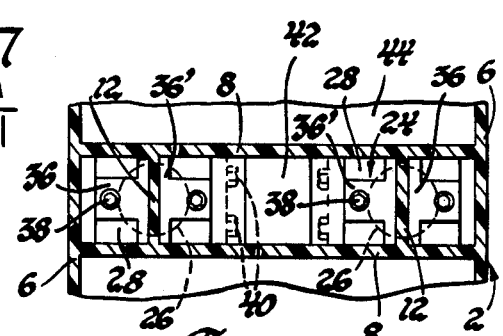
FIG. 9 is a sectioned, bottom view in the direction 9—9 of FIG. 7.
Figure 12:
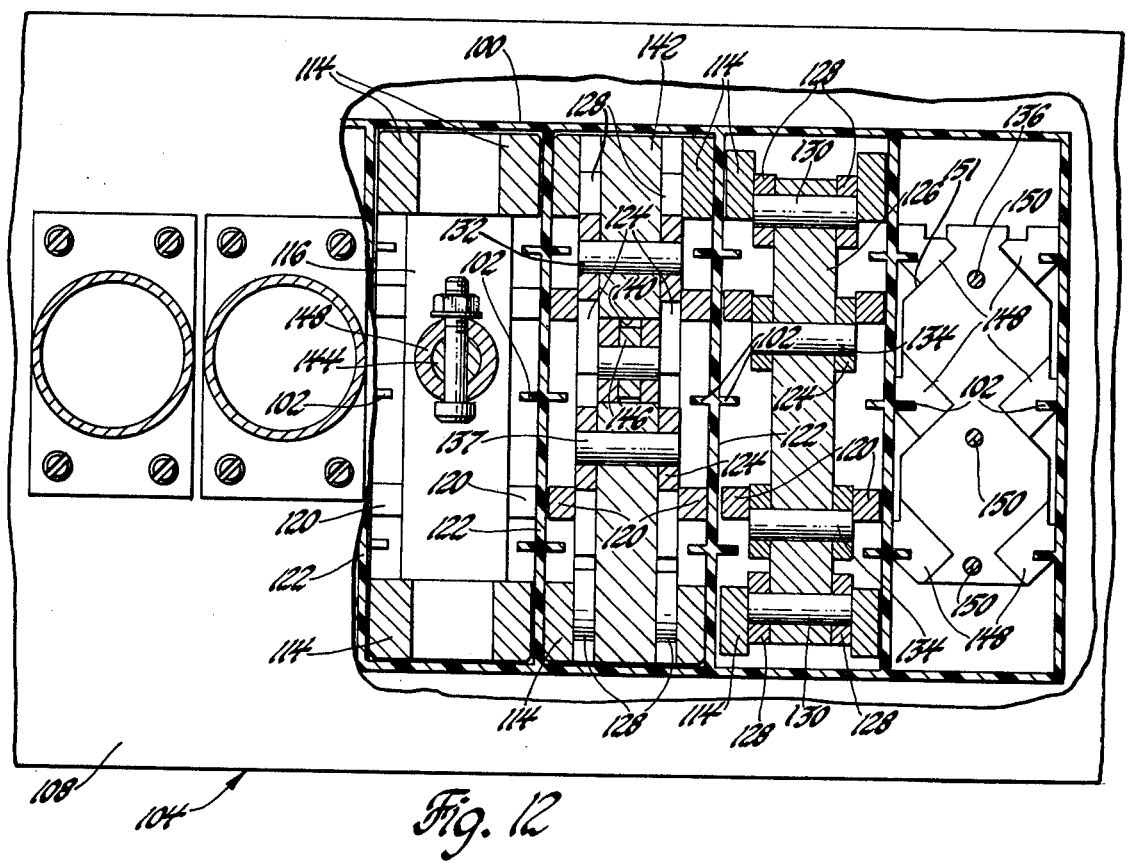
FIG. 12 is a partially sectioned, top view of the detacher of FIG. 11 as viewed along the line 12—12 of FIG. 11.

FIGS. 6–9 show a specific shaving tool design for carrying out the process of this invention to modify a 6 cell, 12 volt battery. A template 44 carries six sets of shavers 24. The shavers 24 are bolted (i.e., 46) to the template 44 which also serves to limit the vertical entry of the shavers 24 into compartments 3. To convert a production line from one standardized battery container to another, only the shavers 24 need be changed which can be done quickly and conveniently. As best shown in FIG. 7, the blade guides 28 are rigidly affixed at one end to the template 44 and at the other ends are bolted (i.e., 40) together by a bracket 42. The guides 28 for each compartment are spaced apart such that the outermost surfaces thereof engage the side walls 6 of the container when inserted which serves to accurately align the shavers 24 with the ribs 10. A sloped surface 72 near the lower ends of the guides 28 facilitate their insertion into the case 2 by providing a camming aligning action against the side walls 6 during insertion. The guides 28 also engage the rib-bearing lateral walls (e.g., the partitions 8) of the compartments which serve as a reference plane for the guiding of the blade 26 by the guides 28. A tubular blade 26 is positioned for rotation in a bore 29 of the guide 28, which bore is maintained in predetermined spaced relation from the partitions 8 by the engagement of the guide 28 with the partitions 8 and keeps the blade 26 from wandering during insertion so that the ribs will be shaved at a uniform height from top to bottom. The ends 76 of the tubular blade 26 have a larger outside diameter than the center portion thereof for engaging the bore 29 and holding the blade 26 tightly, but rotatably therein.

The knife or shaving edges 74 formed by the angular slots 80 in the lower end of the blade 26 are registered with the slots 32 in the guide 28 during insertion and shaving of the ribs 10, which are then within the slots 32. As indicated above, the lower edge 34 of the walls 82 defining the slots 80 form a cutting edge for snipping off the trimmings 30 against the die blocks 36 when the blade 26 is rotated in the manner discussed. The die blocks 36—36 are bolted (i.e., 38) to the bottom of the guides 28 and are spaced apart one from the other sufficiently that the bridge 12 fits therebetween.

The upper end of the blade 26 is splined (i.e., 56) to receive a tube 54 which is rotatably mounted in the bushing 48 for turning the blade 26 to snip off the trimmings 30. The other end of the tube 54 is splined (i.e., 58) into the lever assembly 60 and the blade 26, tube 54 and lever assembly 60 held together by a bolt 61. A set screw 62 prevents axial movement of the tube 54 in the spline 58. The blade 26 is axially positioned within the bore 29 by means of the bushing 48 threaded into the template 44. When the blade's cutting end is properly positioned contiguous the die blocks 36, it is locked in place by the lock nut 50 which is in turn locked in place by the set screw 52. The lever assembly 60 affixed to the tube 54 is coupled to a slide 64 by means of bolt 66. The slide 64 is slideably held in guides 68 (see FIG. 6) for to-and-fro movement therein when driven by appropriate means (not shown) through coupling 70 to snip off the trimmings 30 after insertion and trimming is complete.

Practice of the invention as illustrated in FIGS. 4–9 then involves basically two steps both of which are performed by the same tooling: The first, or shaving, step is performed during insertion of the shaver 24 into the compartment 3 at which time the cutting edge 74 of the blade 26 separates the trimmings 30 from their bore ribs 10 but leaves them still affixed to the top of the bridges 12. When insertion is complete, the slide 64 is energized causing it to act on the levers 60 which in turn rotate the several blades 26 thereby causing their cutting edges 34 to snip off the trimmings at their base.

Figure 13:
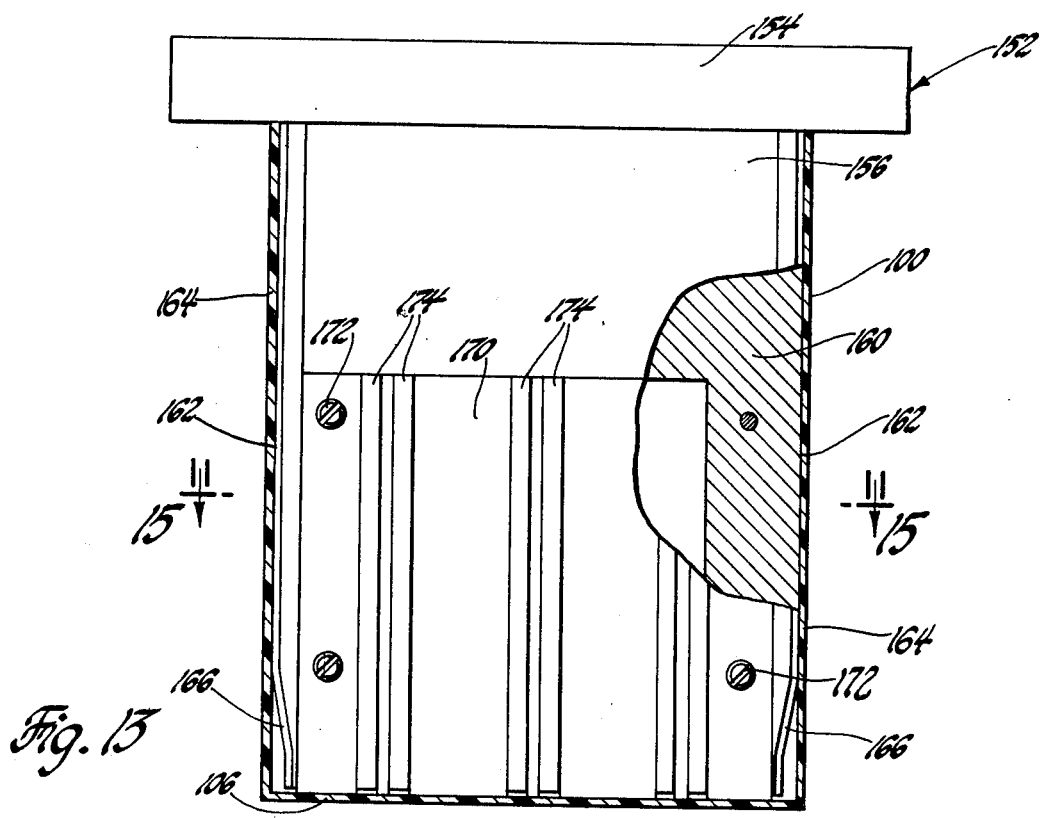
FIG. 13 is a partially sectioned, front elevational view of another shaving trimmer within the scope of this invention.
Figure 14:
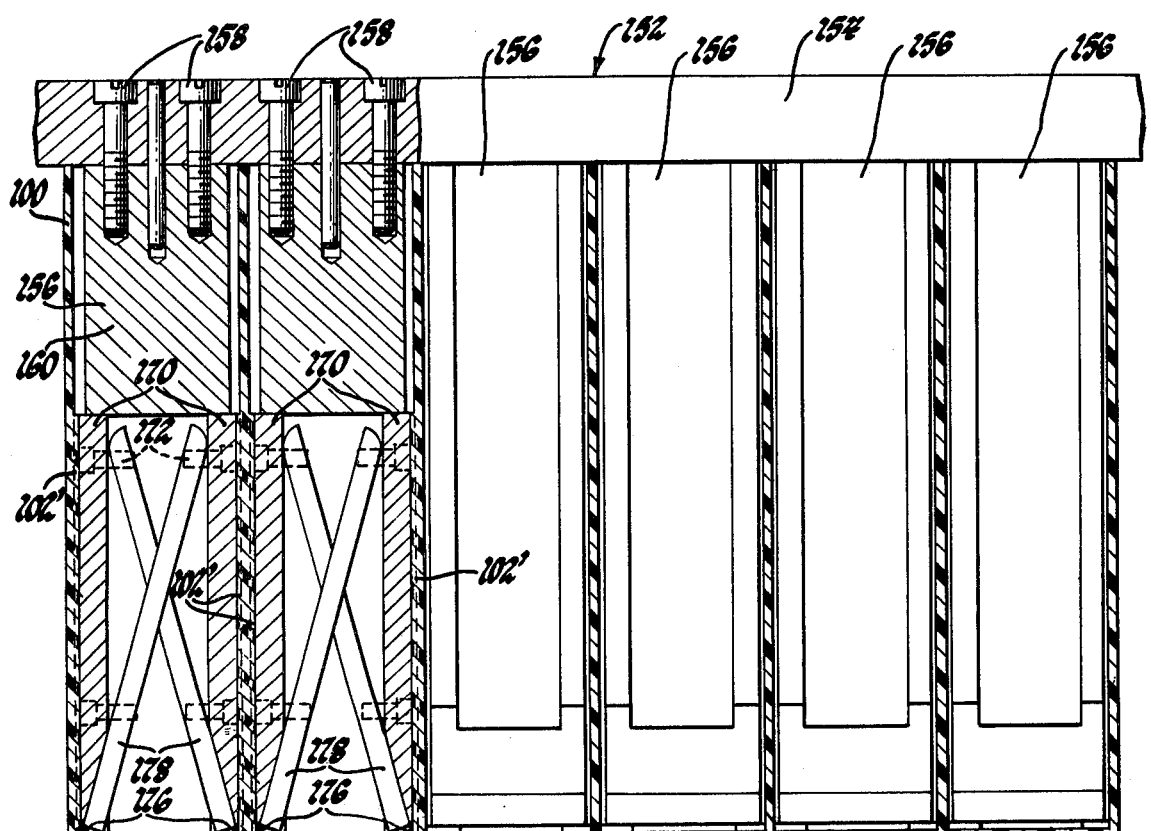
FIG. 14 is a partially sectioned, side elevational view of a group of six shaving trimmers (i.e., FIG. 13) shown in the direction 14—14 of FIG. 15, all of which are mounted for use with a six cell, 12 volt battery container.
Figure 15:
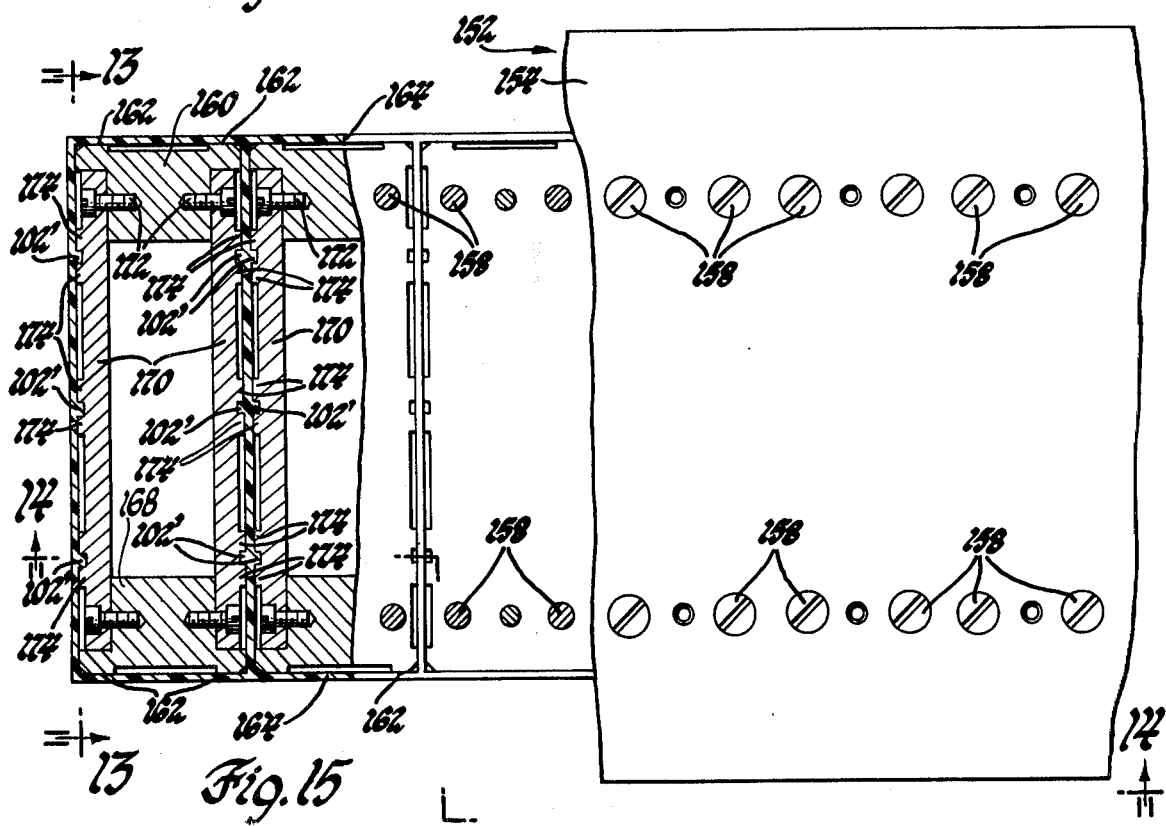
FIG. 15 is a partially sectioned, top view in the direction 15—15 of the shaving trimmer of FIG. 13.

In some instances battery containers/cases are molded without bridges, and the ribs extend to the bottom of the case. In such a situation, the ribs are preferably severed from the bottom of the case prior to shaving. FIGS. 10-15 depict tooling for a two station operation in which the lowermost portions of the ribs are detached from the bottom of the container at the first station and the ribs shaved off in the second station. More specifically, FIGS. 11 and 14 show respectively rib detaching and rib shaving means inserted into a bridgeless case 100. The case 100 has as-molded, unshaved ribs 102 (FIGS. 11 and 12) which following detachment and shaving are lower ribs 102' (FIGS. 14 and 15).

At the first or detacher station, a rib detacher 104 (FIGS. 10-12) is inserted into the cell compartment for severing the ribs 102 at their base from the bottom 106 of the case 100. The rib detacher 104 comprises a mounting plate 108 from which a plurality of slicer heads 110 depend, one for each cell compartment. Each slicer head 110 comprises an inverted U-shaped frame 112 having bifurcated limbs 114 which receive a T-shaped transverse mounting bar 116. The ends of the limbs 114 are beveled 117 which serves to guide the frame 112 into the compartment. Bolts 118 anchor the bar 116 within the bifurcated end portion of the limbs 114 as best seen in FIGS. 10 and 11. A set of case-wall and cutter-carriage guides 120 bolted to the T-bar 116 engage the side walls 122 of the case compartment and cutter-carriage linkage 124 and serve to maintain the cutter-carriage 126 substantially centered within the compartment between the walls 122. The cutter-carriage 126 includes wheels 128 rotatably mounted thereon via axles 130 and a slicer blade 136' mounted thereon. The carriage 126 is joined to the T-bar 116 via the parallel linkage 124 which are rotatably joined, in parallelogram fashion, to both the T-bar 116 and carriage 126 via axles 132 and 134 respectively so that the carriage 126 is movable up and down (i.e., toward and away from T-bar 116) within the forked ends of the bifurcated limbs 114 and between the guides 120. A bore 136 in the cross-bar 138 of the T-bar 116 registers with a vertical slot 140 in the stem 142 of the T-bar 116. A shaft 144 passes through the bore 136 and into the slot 140. A roller 146 is journaled in the end of the shaft 144 within the slot 140 and bears against the top of the cutter-carriage 126. The other end of the shaft 140 is appropriately coupled (e.g., as by sleeve 148) to a pneumatic or hydraulic cylinder (not shown). A readily replaceable (i.e., as by flat head bolts 150) cutter blade 136' (see cell 6 of FIG. 12) has a plurality of knife edges 148 for severing each rib 102 from the bottom of the case.

In operation, the rib detacher 104 is inserted into the cell compartment with the cutter-carriage 126 to the right of the position shown in FIG. 10 and with the ribs 102 aligned with notches 150 adjacent the knife edges 148 of the blade 136'. The downward motion of the detacher 104 continues after the blade 136' engages the bottom 106 of the case which causes the cutter-carriage 126 to slide to the left (see FIG. 10) along the bottom of the case such that the edges 148 cut through the ribs 102 where they meet the bottom 106. Upon completion of this severing operation, the detacher 104 is retracted while the fluid cylinder actuated shaft 144 is extended to return the cutter-carriage to its original position.

After the ribs 102 have been severed from the bottom of the case as just described, the case is moved to a second station for shaving of the ribs to size. FIGS. 13-15 depict a shaving tool for that station. The shaving tool 152 comprises a mounting plate 154 and a plurality of shaving heads 156 bolted (i.e., 158) thereto. The shaving heads 156 comprise an inverted U-shaped frame member 160. The outermost surfaces 162 of the member 160 are adapted to engage the side walls 164 of the battery case 100 for precise location of the tool within the cell compartment. As with the detacher above, beveled faces 166 facilitate entry of the tool into the case 100. The faces of the frame member 160 adjacent the battery case end wall and/or partitions include recessed portions 168 and shaving blades 170 are bolted (i.e., 172) thereon. The shaving blades 170 comprise wall/partition guides 174 which ride against the wall/partition on both sides of the rib being shaved and guide the knife edges 176 of the blade 160 in uniform spaced relation from the walls/partitions for the full length of the shaving stroke. Following shaving, the cases are inverted and the trimmings 178 dumped.

While this invention has been disclosed primarily in terms of specific embodiments thereof, it is not considered restricted thereto but rather only to the extent set forth in the claims which follow.

What is claimed is:

1. A tool for trimming the cell-pack-retaining ribs of a battery case, said case comprising at least two opposed walls defining in part a cell compartment and a plurality of oversized ribs extending outwardly from said walls in opposed relation one to the other, said tool comprising: trimmer means adapted for insertion into said compartment in aligned relation to said ribs and spaced relation to said walls for uniformly trimming back said ribs to a predetermined elevation beyond their associated wall; and guide means cooperatively associated with said trimmer means and adapted to engage said walls immediately adjacent said ribs for guiding said trimmer into said compartment in said spaced relation throughout the full extent of the tool's insertion.

2. A tool for trimming the cell-pack-retaining ribs of a battery case, said case comprising at least two opposed walls defined in part a cell compartment and a plurality of oversized ribs extending outwardly from said walls in opposed relation one to the other, said tool comprising: rotatable tubular blades including rib-shaving edges and adapted for insertion into said compartment with said edges aligned with said ribs and spaced from said walls for uniformly shaving back said ribs to a predetermined elevation beyond their associated wall; guide means rotatably journalling said blades and adapted to engage said walls immediately adjacent said ribs for maintaining said spacing between said blades and walls throughout the full extent of the tool's insertion; and shearing means on said guide means adjacent said edges for cooperating with said rotatable blades to snip off shavings produced at the bases thereof.

* * * * *